United States Patent
Makki et al.

(10) Patent No.: US 12,256,308 B2
(45) Date of Patent: Mar. 18, 2025

(54) RELAYING IN A WIRELESS COMMUNICATION NETWORK

(71) Applicant: Telefonaktiebolaget LM Ericsson (publ), Stockholm (SE)

(72) Inventors: Behrooz Makki, Pixbo (SE); Mikael Coldrey, Borås (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 562 days.

(21) Appl. No.: 17/622,184

(22) PCT Filed: Jun. 27, 2019

(86) PCT No.: PCT/SE2019/050628
§ 371 (c)(1),
(2) Date: Dec. 22, 2021

(87) PCT Pub. No.: WO2020/263140
PCT Pub. Date: Dec. 30, 2020

(65) Prior Publication Data
US 2022/0369201 A1    Nov. 17, 2022

(51) Int. Cl.
H04W 40/22    (2009.01)
H04W 28/02    (2009.01)
H04W 48/20    (2009.01)

(52) U.S. Cl.
CPC ....... *H04W 40/22* (2013.01); *H04W 28/0226* (2013.01); *H04W 28/0236* (2013.01); *H04W 48/20* (2013.01)

(58) Field of Classification Search
CPC ............. H04W 40/22; H04W 28/0226; H04W 28/0236
See application file for complete search history.

(56) References Cited

U.S. PATENT DOCUMENTS

2010/0034135 A1\* 2/2010 Kim .................. H04W 72/0446
370/315
2010/0316096 A1 12/2010 Adjakple et al.
(Continued)

FOREIGN PATENT DOCUMENTS

EP       3874791 A1    9/2021
WO    2014000128 A1    1/2014
(Continued)

OTHER PUBLICATIONS

International Search Report and the Written Opinion of the International Searching Authority, issued in corresponding International Application No. PCT/SE2019/050628, dated Mar. 11, 2020, 10 pages.
(Continued)

*Primary Examiner* — Sulaiman Nooristany
(74) *Attorney, Agent, or Firm* — Rothwell, Figg, Ernst & Manbeck, P.C.

(57) ABSTRACT

The present disclosure relates to a first type node ($AP_3$) in a wireless communication system (1), wherein the first type node ($AP_3$) is adapted to: —communicate with at least one other first type node ($AP_2$) in the wireless communication system (1) over a corresponding backhaul channel ($H_{32}$) by means of one of at least one type of signal relaying that employs decoding and encoding, and —communicate with a corresponding group of second type nodes ($U_{31}$, $U_{32}$) via a corresponding access channel ($h_{31}$, $h_{32}$), each group of second type nodes ($U_{31}$, $U_{32}$) comprising at least one second type node (U31, U32). In the case of a backhaul channel ($H'_{32}$) between the first type node (AP3) and one other first type node ($AP_2$) being determined to be blocked to a certain degree, the first type node ($AP_3$) is further adapted to instruct at least one second type node ($U_{31}$) of the second type nodes in the group of second type nodes ($U_{31}$, $U_{32}$) that is comprised in an over-heard sub-group, to communicate (Continued)

directly with an overhearing first type node ($AP_1$) via a corresponding access channel ($h_{31\text{-}1}$).

12 Claims, 4 Drawing Sheets

(56) References Cited

U.S. PATENT DOCUMENTS

| | | |
|---|---|---|
| 2011/0310789 A1 | 12/2011 | Hu et al. |
| 2016/0226563 A1 | 8/2016 | Kohli |
| 2017/0230880 A1 | 8/2017 | Oroskar et al. |
| 2019/0124696 A1 | 4/2019 | Islam et al. |
| 2019/0187999 A1 | 6/2019 | Lu et al. |

FOREIGN PATENT DOCUMENTS

| | | |
|---|---|---|
| WO | 2019108022 A1 | 6/2019 |
| WO | 2020088773 A1 | 5/2020 |

OTHER PUBLICATIONS

Y. Polyanskiy, H. V. Poor and S. Verdu, "Channel Coding Rate in the Finite Blocklength Regime," IEEE Transactions on Information Theory, vol. 56, No. 5, pp. 2307-2359, May 2010.

Samsung "Necessary Enhancements for NR IAB" 3GPP TSG RAN WG1 Meeting #94b R1-1810864, Chengdu, China, Oct. 8-12, 2018, XP051518269, 12 pages.

3GPP TR38.874, V16.0.0 (Dec. 2018), 3rd Generation Partnership Project; Technical Specification Group Radio Access Network; NR; Study on Integrated Access and Backhaul; (Release 16), Dec. 2018, 111 pages.

\* cited by examiner

RELAYING IN A WIRELESS COMMUNICATION NETWORK

CROSS REFERENCE TO RELATED APPLICATION(S)

This application is a 35 U.S.C. § 371 National Phase Entry Application from PCT/SE2019/050628, filed Jun. 27, 2019, designating the United States, the disclosure of which is incorporated herein by reference in its entirety.

TECHNICAL FIELD

The present disclosure relates to relaying in wireless communication networks, in particular in integrated access and backhaul (IAB) networks.

BACKGROUND

The fifth generation of wireless networks (5G) must provide high-rate data streams for everyone everywhere at any time. To meet such demands, it is required to use large bandwidths. Here, it is mainly concentrated on millimeter wave-based, potentially, massive multiple-input and multiple-output (MMIMO), links as a key enabler to obtain sufficiently large bandwidths/data rates. Importantly, the presence of very wide bandwidths makes it possible to include the wireless backhaul transport in the same spectrum as the wireless access. In such a setup, there is thus a sharing of radio resources between access and backhaul links which implies that access and backhaul links compete over the same radio resources pool.

For this reason, 3GPP has considered such integrated access and backhaul (IAB) network configurations where an access point (AP), that for example can be fiber-connected, provides other AP:s as well as the customer-premises equipments (CPE:s) inside its cell area with wireless backhaul and access connections, respectively. The access-integrated backhaul link can either be a single-hop or multi-hop link in an IAB network. In a multi-hop deployment, the IAB network from one AP is relayed along a certain route from AP to AP until it reaches its destination. IAB networks can thus have either star-like configuration with multiple AP:s wirelessly backhauled through direct single-hop connections to the fiber-connected AP, or a cascade configuration with AP:s wirelessly connected to the fiber-connected AP in a multi-hop fashion.

The network can thus be densified with a large number of access points (AP:s), each one serving a number of CPE:s inside its corresponding small cell area. Compared to the cases with few macro BSs covering a wide area, less path loss/shadowing, and higher LOS connection probability are expected in dense small-cell networks. As a result, better channel quality is experienced in these short-range links, compared to the cases with few macro BSs. Due to high installation cost of fiber links as well as traffic jams and infrastructure displacements, the small AP:s need to be supported by high-rate LOS wireless backhaul links.

Among the advantageous of IAB networks are the followings:
Cost Reduction:
A fiber optic link is relatively expensive in metropolitan areas, with a majority of the total figure tied to trenching and installation. For this reason, as well as the traffic jams and infrastructure displacements, some cities have considered a moratorium on fiber trenching specially in historical areas. In such scenarios, millimeter wave-based wireless backhaul is the best alternative providing almost the same rate as fiber optic with significantly less price and no digging.

Link Quality Enhancement:
Compared to the direct macro base station (BS)-CPE link, less path loss/shadowing, and higher line-of-sight (LOS) connection probability are expected for the wirelessly backhauled AP-CPE connections within small cells. As a result, better channel quality is experienced in such small cells, compared to the cases with direct macro BS-CPE connection.

Long-Term Network Planning:
IAB systems are of most interest in small cell backhaul and fixed wireless access (FWA) networks with stationary AP:s/CPE:s. This makes it possible to predict the channel quality and perform accurate network planning for multiple packet transmissions.

In an IAB network, the backhaul, i.e., the AP-AP, link is the bottleneck of the transmission setup. The main issues of such links are 1) blockage and 2) error propagation. Particularly, the AP-AP backhaul links transfer an aggregated data of a large number of CPE:s served by, e.g., different AP:s of the multi-hop network. Thus, to support high rates, narrow beams at millimeter wave bandwidths with strong line-of-sight (LOS) signal components can be used. As a result, the system performance is significantly affected if the LOS link is blocked. Particularly, with a multi-hop network configuration, if an AP-AP link is blocked, e.g., by a truck or a group of flying birds, the error propagates and an outage will occur for all AP:s in the successive hops as well as their corresponding CPE:s.

In summary, the implementation of IAB systems results in high-rate backhaul links which should satisfy strict rate/reliability requirements with high sensitivity to blockage.

Generally, it is therefore a desire to have a node in a wireless communication system which communicate with at least one other node, where blockage/error propagation is compensated for.

SUMMARY

It is an object of the present disclosure to provide a node in a wireless communication system which communicate with at least one other node, where blockage/error propagation is compensated for.

This object is obtained by means of a first type node in a wireless communication system, wherein the first type node is adapted to communicate with at least one other first type node in the wireless communication system over a corresponding backhaul channel by means of one of at least one type of signal relaying that employs decoding and encoding, and to communicate with a corresponding group of second type nodes via a corresponding access channel. Each group of second type nodes comprises at least one second type node. In the case of a backhaul channel between the first type node and one other first type node being determined to be blocked to a certain degree, the first type node is further adapted to instruct at least one second type node of the second type nodes in the group of second type nodes that is comprised in an over-heard sub-group, to communicate directly with an overhearing first type node via a corresponding access channel.

In this way, the reliability of the network is increased in cases with blockage, and the probability of error propagation is reduced. Particularly, the same end-to-end error probability can more or less be guaranteed for the overheard second type nodes with no or marginal increment of the end-to-end packet transmission delay. Moreover, the developed scheme reduces the cost of hybrid automatic repeat request (HARQ)-based retransmissions as well as the decoding complexity/delay of the overheard second type nodes. This results in higher reliability and end-to-end throughput in the cases experiencing blockage.

According to some aspects, the overhearing first type node is separate from the first type node and the other first type node, where an additional spectral resource becomes available for communication between the first type node and the other first type node when the at least one second type node of the second type nodes in the group of second type nodes that is comprised in an over-heard sub-group, communicates directly with the overhearing first type node via the corresponding access channel.

In this way, an additional spectral resource becomes available for communication between the first type node and the other first type node According to some aspects, the first type node is adapted to instruct the second type node to encode a signal to be transmitted directly to the overhearing first type node at an adapted transmission rate by means of two or more sub-signals and/or provide a wider antenna beam towards the overhearing first type node.

In this way, the reliability of the network is further increased.

According to some aspects, the first type node is adapted to form an encoded signal corresponding to a signal received from at least one other second type node of the second type nodes in the group of second type nodes that is comprised in an isolated sub-group, and to forward the encoded signal to the other first type node. For this purpose, the first type node is adapted to encode the signal at an adapted transmission rate by means of two or more sub-signals, and/or provide a wider antenna beam towards the other first type node, and/or provide an increased transmission power.

In this way, even a second type node that is comprised in an isolated sub-group can communicate in spite of the channel blockage.

According to some aspects, the first type node is adapted to inform the other first type node about the forwarded encoded signal, enabling the other first type node to decode each received signal having an adapted transmission rate comprising two or more sub-signals when all sub-signals of the signal have been received and buffered. This also enables the other first type node to re-encode said signal for a nominal transmission rate, or at least for a data rate that is adapted to the free spectrum determined to be presently available, before forwarding the re-encoded signal to a further first type node.

According to some aspects, after a predetermined time, the first type node is adapted to check whether the backhaul channel between the first type node and the other first type node is determined to be blocked to said certain degree based on determined link signal-to-noise ratio (SNR) between the first type node and the other first type node and/or whether the first type node receives acknowledgement/negative acknowledgement (ACK/NACK) feedback to a certain degree from the other first type node.

In this way, regular communications can be resumed when the channel is not blocked anymore.

According to some aspects, the first type node is adapted for access communication with two or more other first type nodes, where the communication between all the first type nodes is a backhaul communication via corresponding backhaul channels. The backhaul communication and the access communication are both performed by means of a common equipment at the first type nodes.

This means that the present disclosure is applicable for IAB networks.

This object is also obtained by means of a second type node in a wireless communication system, where the second type node is comprised in a group of at least one second type nodes, where all second type nodes in the group are adapted to communicate with a first type node via a corresponding access channel. In the case of a backhaul channel between the first type node and one other first type node being determined to be blocked to a certain degree, the second type node that is comprised in an over-heard sub-group is adapted to communicate directly with an overhearing first type node via a corresponding access channel.

In this way, the reliability of the network is increased in cases with blockage, and the probability of error propagation is reduced. Particularly, the same end-to-end error probability can more or less be guaranteed for the overheard second type nodes with no or marginal increment of the end-to-end packet transmission delay. Moreover, the developed scheme reduces the cost of hybrid automatic repeat request (HARQ)-based retransmissions as well as the decoding complexity/delay of the overheard second type nodes. This results in higher reliability and end-to-end throughput in the cases experiencing blockage.

According to some aspects, the overhearing first type node is separate from the first type node and the other first type node, where an additional spectral resource becomes available for communication between the first type node and the other first type node when the second type node communicates directly with the overhearing first type node via the corresponding access channel.

In this way, an additional spectral resource becomes available for communication between the first type node and the other first type node According to some aspects, the second type node is adapted to encode a signal to be transmitted directly to the overhearing first type node at an adapted transmission rate by means of two or more sub-signals and/or provide a wider antenna beam towards the overhearing first type node.

In this way, the reliability of the network is further increased.

This object is also obtained by means of methods that are associated with the above advantages.

BRIEF DESCRIPTION OF THE DRAWINGS

The present disclosure will now be described more in detail with reference to the appended drawings, where.

DETAILED DESCRIPTION

Figure 1:
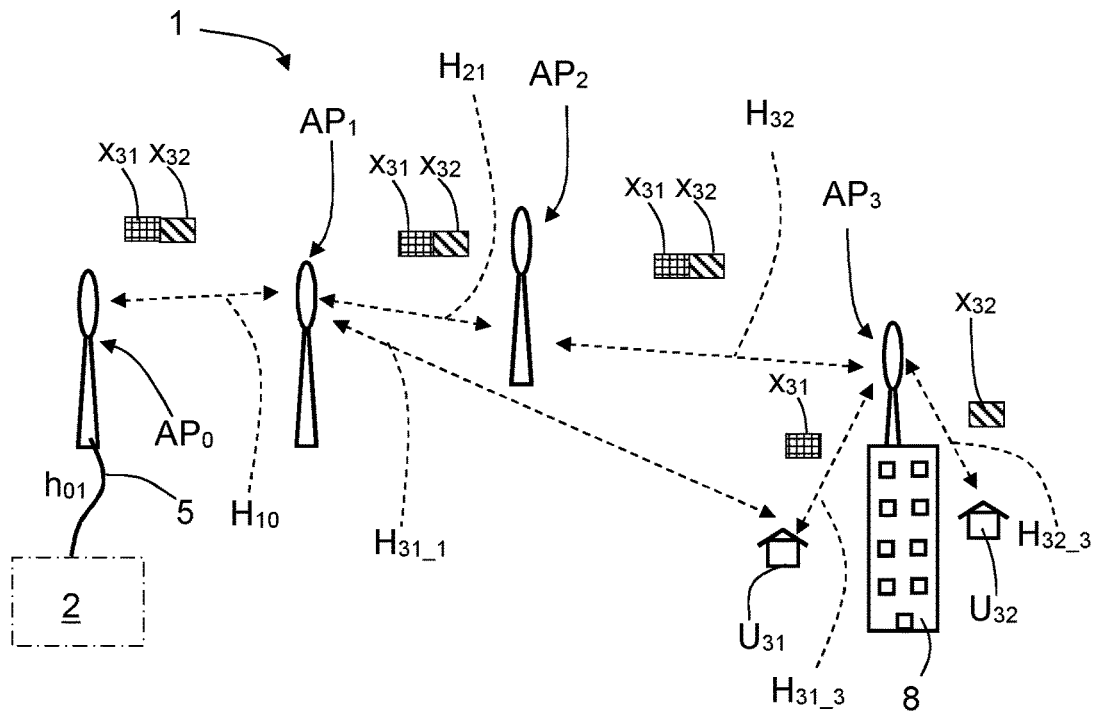
FIG. 1 schematically shows a view of a wireless communication system in a first situation.

Aspects of the present disclosure will now be described more fully hereinafter with reference to the accompanying drawings. The different devices, systems, computer programs and methods disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the invention. As used herein, the singular forms "a", "an" and "the" are intended to include the plural forms as well, unless the context clearly indicates otherwise.

Network densification takes advantage of wireless backhaul; due to a relatively high installation cost of fiber links, as well as traffic jams and infrastructure displacements, the relatively small access points (AP:s) need to be supported by high-rate LOS wireless backhaul links which motivates so-called integrated access and backhaul (IAB) networks.

IAB systems are of most interest in small cell backhaul and fixed wireless access (FWA) networks with stationary AP:s/CPE:s and static channels. As a result, network planning can be made with high reliability for multiple packet transmissions, and the network works well if no blockage occurs. This is especially because the AP-AP backhaul links experience strong LOS signal components which enables high-rate backhauling. However, if the backhaul links are temporally blocked by, e.g., a truck passing by, there will be a significant performance drop, and an aggregated data of multiple CPE:s are lost. This results in error propagation in multiple hops as well as high decoding complexity/delay and feedback overhead because we may need multiple hybrid automatic repeat request (HARQ)-based packet retransmissions.

With reference to FIG. 1, there is a wireless communication system 1 comprising an IAB network with three hops. There are first type nodes $AP_0$, $AP_1$, $AP_2$, $AP_3$ in the wireless communication system 1, here in the form of a first access point $AP_0$, a second access point $AP_1$, a third access point $AP_2$ and a fourth access point $AP_3$. The access points $AP_0$, $AP_1$, $AP_2$, $AP_3$ are arranged for communication with each other in the wireless communication system 1 over a corresponding backhaul channel $H_{10}$, $H_{21}$, $H_{32}$, having a channel quality, generally by means of one of at least one type of signal relaying that employs decoding and encoding. According to some aspects, the signal relaying is constituted by decoding-encoding forward, DF, relaying of a signal and/or amplitude-forward, AF, relaying of a signal. The fourth access point $AP_3$ is adapted to communicate with the fourth access point $AP_2$ over a corresponding third backhaul channel $H_{32}$ by means of one of at least one type of signal relaying that employs decoding and encoding.

Each access point $AP_0$, $AP_1$, $AP_2$, $AP_3$ is adapted for access communication with a corresponding group of second type nodes. For the sake of clarity in the example to be described, only two second type nodes $U_{31}$, $U_{32}$ are shown, and are served by the fourth access point $AP_3$. All access points normally serve a corresponding group of second type nodes, and the fourth access point $AP_3$ can serve more than the two second type nodes $U_{31}$, $U_{32}$ shown. The fourth access point $AP_3$ is adapted for access communication with the two second type nodes $U_{31}$, $U_{32}$ via a corresponding access channel $H_{31\_3}$, $H_{32\_3}$, providing wireless access. The second type nodes $U_{31}$, $U_{32}$ are here in the form of customer-premises equipments (CPE:s), and generally each group of CPE:s $U_{31}$, $U_{32}$ comprises at least one CPE. Here the group that is served by the fourth access point $AP_3$ comprises a first CPE $U_{31}$ and a second CPE $U_{32}$, where the fourth access point $AP_3$ is adapted for access communication with the two CPE:s via a corresponding first access channel $H_{31\_3}$ and second $H_{32\_3}$.

The communication between the access points $AP_0$, $AP_1$, $AP_2$, $AP_3$ is according to some aspects a backhaul communication via the corresponding backhaul channel $H_{10}$, $H_{21}$, $H_{32}$, and in the IAB network the backhaul communication and the access communication are both performed by means of a common equipment at the access points $AP_0$, $AP_1$, $AP_2$, $AP_3$. The second access point $AP_1$, the third access point $AP_2$ and the fourth access point $AP_3$ are wirelessly backhauled by the first access point $AP_0$ connecting to a core network 2 using a fiber connection 5.

In IAB networks, uplink (UL) and downlink (DL) transmission does not follow the common definition, as both endpoints of the backhaul links are access points. However, for simplicity, we refer to data transmission towards (resp. from) the first access point $AP_0$ as UL (resp. DL) transmission.

Considering FIG. 1, the discussions in the following example relate to UL transmission from the CPE:s $U_{31}$, $U_{32}$ served by the fourth access point $AP_3$, and generally the channel coefficients in the $U_{ij}$-$AP_k$ and $AP_i$-$AP_j$ links are represented by $H_{ij\_k}$ and $H_{ij}$, respectively. However, the same discussions can be applied for DL transmission as well.

Also, a setup for time-division multiple access (TDMA) is presented. However, the same scheme can also be adapted for other resource allocation approaches such as for example frequency-division multiple access (FDMA) and code-division multiple access (CDMA).

As shown in FIG. 1, the group of CPE:s $U_{31}$, $U_{32}$ that is served by the fourth access point $AP_3$ comprises an over-heard sub-group. The over-heard sub-group comprises one or more CPE:s that have a fairly good channel to at least one overhearing AP, that is not the serving AP, where the channel to the overhearing AP is not good enough for it to be the to be the serving access point for that CPE. In this example, the over-heard sub-group is only constituted by the first CPE $U_{31}$, and the overhearing AP is the second access point $AP_1$, where the first CPE $U_{31}$ can communicate with the second access point $AP_1$ via an overhearing channel $H_{31\_1}$.

Figure 2:
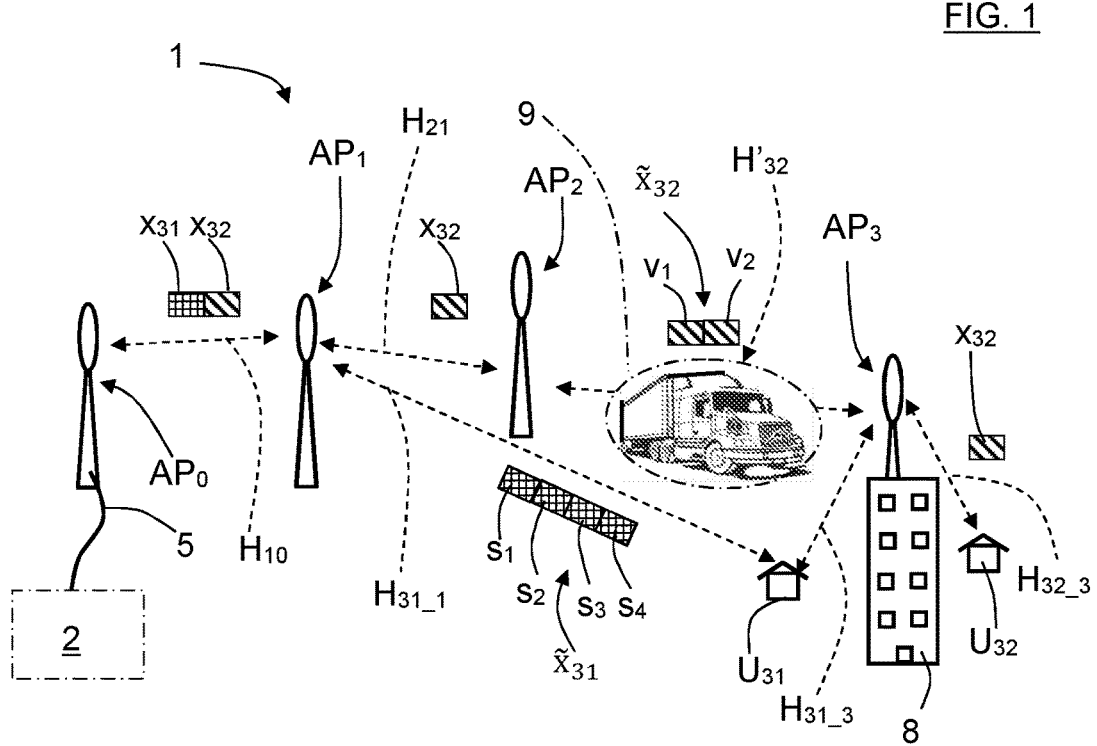
FIG. 2 schematically shows a view of the wireless communication system in a second situation.

With reference to FIG. 2, there is an obstacle 9 that temporarily changes the third backhaul channel $H'_{32}$, here in the form of a vehicle such that the third backhaul channel $H'_{32}$ is blocked to a certain degree. The fourth access point $AP_3$ is then adapted to instruct its served CPE:s that are comprised in the over-heard sub-group to instead communicate with their associated overhearing AP, in this example the first CPE $U_{31}$ is instructed to communicate with the second access point $AP_1$ via the overhearing channel $H_{31\_1}$. With reference also to FIG. 3B, in order to establish communication with the second access point $AP_1$, the first CPE $U_{31}$ is adapted to direct its antenna beam 7 towards the second access point $AP_1$. According to some aspects, due to the overhearing channel $H_{31\_1}$ in this example offering less transmission properties than the first access channel $H_{31\_3}$, the first CPE $U_{31}$ is adapted to encode a signal $x_{31}$ to be transmitted directly to the second access point $AP_1$ at an adapted transmission rate by means of two or more sub-signals, here four sub-signals $s_1$, $s_2$, $s_3$, $s_4$, and/or provide a wider antenna beam 7 towards the second access point $AP_1$. This can be done with or without to instructions from the fourth access point $AP_3$.

According to some aspects, first CPE $U_{31}$ is adapted to inform the second access point $AP_1$ about the forwarded encoded signal $\tilde{x}_{31}$, enabling the second access point $AP_1$ to decode each received signal $\tilde{x}_{31}$ having an adapted transmission rate comprising two or more sub-signals $s_1$, $s_2$, $s_3$, $s_4$ when all sub-signals $s_1$, $s_2$, $s_3$, $s_4$ of the signal $\tilde{x}_{31}$ have been received and buffered, and to re-encode said signal $\tilde{x}_{31}$ for a nominal transmission rate, or at least for a data rate that is adapted to the free spectrum determined to be presently available, before forwarding the re-encoded signal $x_{31}$ to the first application point $AP_0$.

As shown in FIG. 1, the group of CPE:s $U_{31}$, $U_{32}$ that is served by the fourth access point $AP_3$ comprises an isolated sub-group. The isolated sub-group comprises one or more CPE:s that do not have a working channel to any other AP than the serving AP. In this example, the isolated sub-group is only constituted by the second CPE $U_{32}$, where the isolation is due to a building 8 blocking communication possibilities with any other AP than the serving fourth access point $AP_3$.

Since in this example the overhearing AP, the second access point $AP_1$, is not any AP with which the fourth access point $AP_3$ is adapted for direct backhaul communication, as in this example the third access point $AP_2$, an additional spectral resource becomes available, for example for communication between the fourth access point $AP_3$ and the third access point $AP_2$. The additional spectral resource can then be used for a signal $x_{32}$ that is transmitted from the second CPE $U_{32}$ that is comprised in the isolated sub-group, to the fourth access point $AP_3$, when the fourth access point $AP_3$ is going to transmit this signal further to the third access point $AP_2$, via the obstacle 9.

For this purpose, the fourth access point $AP_3$ is adapted to form an encoded signal $\tilde{x}_{32}$ corresponding to the signal $x_{32}$ received from the second CPE $U_{32}$, and to forward the encoded signal $\tilde{x}_{32}$ to the third access point $AP_2$. In order to accomplish this, the additional spectral resource is used, and according to some aspects the fourth access point $AP_3$ is adapted to perform the encoding of the signal $\tilde{x}_{32}$ at an adapted transmission rate by means of two or more sub-signals, here two sub-signals $v_1$, $v_2$, and/or provide a wider antenna beam 7 towards the third access point $AP_2$, and/or provide an increased transmission power.

According to some aspects, the fourth access point $AP_3$ is adapted to inform the third access point $AP_2$ about the forwarded encoded signal $\tilde{x}_{32}$, enabling the third access point AP2 to decode each received signal $\tilde{x}_{32}$ having an adapted transmission rate comprising two or more sub-signals $v_1$, $v_2$ when all sub-signals $v_1$, $v_2$ of the signal have been received and buffered, and enabling third access point $AP_2$ to re-encode said signal $\tilde{x}_{32}$ for a nominal transmission rate, or at least for a data rate that is adapted to the free spectrum determined to be presently available, before forwarding the re-encoded signal $x_{32}$ to the second access point $AP_1$.

The number of sub-signals $s_1$, $s_2$, $s_3$, $s_4$; $v_1$, $v_2$, used depends on the channel quality, and if the channel quality is sufficiently good, a division into sub-signals is not needed.

The overhearing AP can generally be any AP except the serving AP. In the present example, if the overhearing AP is an AP with which the fourth access point $AP_3$ is adapted for direct backhaul communication, such as the third access point AP2, there are no additional spectral resource that becomes available, for example for communication between the fourth access point $AP_3$ and the third access point $AP_2$.

According to some aspects, after a predetermined time, the first type node $AP_3$ is adapted to check whether the backhaul channel $H'_{32}$ between the first type node $AP_3$ and the other first type node $AP_2$ is determined to be blocked to said certain degree based on determined link signal-to-noise ratio (SNR) between the first type node $AP_3$ and the other first type node $AP_2$ and/or whether the first type node $AP_3$ receives acknowledgement/negative acknowledgement (ACK/NACK) feedback to a certain degree from the other first type node $AP_2$. Alternatively, direct channel measurement by pilots can be used.

In the following, the present example will now be discussed more in detail, and it is to be understood that the analytical results can be extended to any applicable case, a similar approach being applicable for the cases with different numbers of hops, different lengths of the CPE:s' signals and different lengths in different hops. The analytical results are presented for the cases with single antennas, but the same discussions can be applied for the cases with multiple antennas. Some previously described features and steps will be repeated here in order to present a complete detailed discussion.

UL transmission will be discussed in, e.g., $U_{31}$-$AP_3$-$AP_2$-$AP_1$-$AP_0$ route, and it is assumed that there is a temporal blockage 9 in the $AP_3$-$AP_2$ link as described above. In this case, the data transmission follows the following procedure:

Step 1: Based on the channels qualities, each CPE is assigned to one AP which is the main node responsible for its data transmission. The CPE:s associated with $AP_j$ are denoted by $U_{jn}$, n=1, ..., N, where N is the number of CPE:s allocated for each AP. The signal of $U_{jn}$ is presented by $x_{jn}$, $\forall i, n$.

Step 2: Depending on the quality of the channels to the neighbor AP(s), the CPE:s of each AP are divided into two sub-groups. The CPE:s that have fairly good channels to neighbor AP:s, but not good enough to be in their associated group, are divided into an over-heard sub-group. On the other hand, the CPE:s that have good links only to their master AP are categorized into an isolated sub-group. For instance, in FIG. 2, the first CPE $U_{31}$ is in the over-heard sub-group because it has a fairly good channel to $AP_1$, while the second CPE $U_{32}$ is grouped into the isolated sub-group because it has good channel only to the fourth access point $AP_3$. The resource allocation is performed based on the quality of the channels in, e.g., $U_{31}$-$AP_3$-$AP_2$-$AP_1$-$AP_0$ route and narrow antenna beams are used by the AP:s to forward the signals $x_{31}$ and $x_{32}$ to $AP_0$. The length of the signals discussed $x_{31}$, $x_{32}$ is denoted by L. Also, the channel coefficient in the $U_{ij}$-$AP_k$ and $AP_i$-$AP_j$ links is represented by $H_{ij\_k}$ and $H_{ij}$, respectively, and the channel gains are defined as $G_{ij\_k} = |H_{ij\_k}|^2$ and $G_{ij} = |H_{ij}|^2$. Then, the end-to-end error probability for the data transmission of $x_{31}$ is given by:

$$\epsilon_{E2E} = 1 - (1 - \epsilon_{31\_3})(1 - \epsilon_{32})(1 - \epsilon_{21})(1 - \epsilon_{10}),$$

$$\epsilon_{31\_3} = Q\left(\frac{\sqrt{L}\left(\log(1 + P_{31}G_{31\_3}) - \frac{K_{31}}{L}\right)}{\sqrt{1 - \frac{1}{(1 + P_{31}G_{31\_3})^2}}}\right),$$

and $$\epsilon_{32} = Q\left(\frac{\sqrt{L}\left(\log(1 + P_3 G_{32}) - \frac{K_{31}}{L}\right)}{\sqrt{1 - \frac{1}{(1 + P_3 G_{32})^2}}}\right)$$

(1)

$$\epsilon_{21} = Q\left(\frac{\sqrt{L}\left(\log(1+P_2 G_{21}) - \frac{K_{31}}{L}\right)}{\sqrt{1 - \frac{1}{(1+P_2 G_{21})^2}}}\right), \quad (1)$$

$$\epsilon_{10} = Q\left(\frac{\sqrt{L}\left(\log(1+P_1 G_{10}) - \frac{K_{31}}{L}\right)}{\sqrt{1 - \frac{1}{(1+P_1 G_{10})^2}}}\right),$$

where $P_{ij}$ and $P_j$ denote the transmission power of CPE $U_{ij}$ and $AP_j$, respectively, and the variance of the additive noises at the AP:s is normalized to 1. Also, Q(.) represents the Gaussian Q function and $K_{ij}$ is the number of information bits in the message of CPE $U_{ij}$. Then, $\epsilon_{ij\_k}$ and $\epsilon_{ij}$ are the error probabilities in the $U_{ij}$-$AP_k$ and $AP_1$-$AP_j$ hops, respectively. Finally, in (1) there is assumed an SNR x, codewords of length L and K information bits per codeword, the error probability is given by $$\epsilon = Q\left(\frac{\sqrt{L}\left(\log(1+x) - \frac{K}{L}\right)}{\sqrt{1 - \frac{1}{(1+x)^2}}}\right). \quad (2)$$

However, the same discussions can be applied in the cases with different coding schemes.

Step 3: It is an aim to obtain about the same performance for all CPE:s in the cases where one of the AP-AP links is temporally blocked, here there is a blockage 9 in the $AP_3$-$AP_2$ link. In this case, the data transmission of the over-heard and isolated CPE:s are adapted in different ways as follows.

Transmission adaptation for the over-heard CPE: The over-heard first CPE $U_{31}$ adapts its beamforming towards the second access point $AP_1$ as well as the length of its signal to send the data directly to the second access point $AP_1$. Particularly, to satisfy the same end-to-end error probability for the first CPE $U_{31}$ and for a given channel realization $G_{31\_1}$, variable-length coding is used to generate a new signal $\tilde{x}_{31}$ of length $\tilde{L}$ and rate $$\tilde{R}_{31} = \frac{K_{31}}{\tilde{L}},$$

i.e., with more redundancy bits and lower rate, where, considering FIG. 2 and equation (1), the length is found by $L = \arg\min_x \{\tilde{\epsilon}_{E2E} = \epsilon_{E2E}\}$, and $$\tilde{\epsilon}_{E2E} = 1 - \left(1 - Q\left(\frac{\sqrt{x}\left(\log(1+P_{31}G_{31\_1}) - \frac{K_{31}}{x}\right)}{\sqrt{1 - \frac{1}{(1+P_{31}G_{31\_1})^2}}}\right)\right) \quad (3)$$

$$\left(1 - Q\left(\frac{\sqrt{L}\left(\log(1+P_1 G_{10}) - \frac{K_{31}}{L}\right)}{\sqrt{1 - \frac{1}{(1+P_1 G_{10})^2}}}\right)\right)$$

That is, equation (3) finds the length of the new signal such that the same end-to-end error probability is guaranteed for the first CPE $U_{31}$ when sending the data in the $U_{31}$-$AP_1$-$AP_0$ route. Let $\lceil x \rceil$ denote the smallest integer greater than or equal to x. Then, to follow the same slotted communication as in the cases with no blockage, $\tilde{x}_{31}$ is chopped into $$S = \left\lceil \frac{\tilde{L}}{L} \right\rceil$$

sub-codewords, or sub-signals, which are sent to the second access point $AP_1$ in S time slots. In this way, the scheduling rule of the other CPE:s, e.g., $U_{2n}$, n=1, ..., N, is not affected by the blockage. Finally, the second access point $AP_1$ adapts the decoding scheme where, without message decoding, it buffers the sub-codewords received in S time slots and only decodes the message when it receives and concatenates all sub-codewords of $\tilde{x}_{31}$.

Transmission adaptation for the isolated CPE: The message of the second CPE $U_{32}$ still reaches the first access point $AP_0$ through $U_{32}$-$AP_3$-$AP_2$-$AP_1$-$AP_0$ route. However, the following modifications are applied:

1) $AP_2$ uses the spectrum resource which has been freed up, due to transmitting the message of the first CPE $U_{31}$ directly to the second access point $AP_1$, to generate a new message $\tilde{x}_{32}$ of length 2L and rate $$\tilde{R}_{32} = \frac{K_{32}}{2L}.$$

2) Use a wider beam, or the second-best beam, and, possibly, higher power to send the message to the third access point $AP_2$ in two sub-codewords, or sub-signals, $v_1$, $v_2$ of length L.

3) The third access point $AP_2$ buffers the received sub-codewords and decodes the message when both sub-codewords $v_1$, $v_2$ are received.

Step 4: Once the messages of the CPE:s $U_{31}$, $U_{32}$ have been correctly decoded by the corresponding access point $AP_1$, $AP_2$, the respective access point $AP_1$, $AP_2$ re-encodes the long codewords $\tilde{x}_{31}$, $\tilde{x}_{32}$ to the original short codewords $x_{31}$, $x_{32}$ of length L and send the signals to the next AP:s.

Step 5: Based on different network configurations, the synchronizations and the timing of the network are updated. Here, it is important to note that, because of the specific static characteristics of the IAB networks, according to some aspects, all adaptations, e.g., the buffering/decoding schemes of the AP:s, the encoding schemes of the AP:s/CPE:s, the beamforming, the timing advance and the synchronization, are designed offline. Then, as soon as a link is blocked, the network switches immediately to the new configuration with no need for additional initial access or synchronization procedure. The data transmission continues for M time slots considered by the network designer. After M time slots, e.g., the third access point $AP_2$ checks whether the blockage is removed which is used to decide about the network configuration. The decision on the blockage status can be made based on the link signal-to-noise ratio SNR, where we consider a link blocked if the observed SNR is below a threshold. In another embodiment, a blockage is detected if fourth access point $AP_3$ receives no acknowledgement/negative acknowledgement (ACK/NACK) feedback or NACKs in few successive slots from the third access point $AP_2$.

As a conclusion, different transmission schemes are considered for the over-heard and isolated CPE:s. The first CPE $U_{31}$ changes its beamforming towards the second access point $AP_1$, i.e., its second-best AP, and sends a long codeword $\tilde{x}_{31}$ in S time slots where S is found through (3). The second access point $AP_1$ buffers all received sub-codewords and decodes the message only when all sub-codewords are accumulated. In this way, the scheduling rule of the CPE:s $U_{2n}$, n=1, . . . , N, is not affected by the blockage and the decoding complexity and delay do not increase by multiple HARQ-based decodings. The message of the isolated second CPE $U_{32}$, on the other hand, still goes through the $AP_3$-$AP_2$ link. However, the fourth access point $AP_3$ uses variable-length coding to use the spectrum which has been freed up, due changing the route of $U_{31}$. Particularly, a long signal $\tilde{x}_{32}$ of length 2L and rate $$\tilde{R}_{32} = \frac{K_{32}}{2L}$$

is generated by $AP_3$ and sent to the third access point $AP_2$ in two time slots. Also with reference to FIG. 3A, according to some aspects, the beamforming of $AP_3$ is changed either by using a second-best antenna beam 10 or by widening the antenna beam 10, and the transmission power increases to reduce the effect of blockage 9. Then the third access point $AP_2$ buffers the sub-codewords of $\tilde{x}_{32}$ and decodes the message only when two sub-codewords $v_1$, $v_2$ are received. When the messages of the first CPE $U_{31}$ and the second CPE $U_{32}$ are correctly decoded by the second access point $AP_1$ and the third access point $AP_2$, respectively, they re-encode the long codewords to the original short codewords $x_{31}$, $x_{32}$ of length L and send the signals to the next AP:s.

Considering the present disclosure as disclosed above, the following points are interesting to note:

The proposed scheme reduces the blockage and error propagation effects because 1) the over-heard CPE:s bypass the blockage, and
2) along with using more conservative beamforming, the freed-up spectrum is used to reduce the data rate of the isolated CPE:s.

Also, while the end-to-end error probability of the over-heard CPE:s is guaranteed, its end-to-end packet transmission delay is not much affected. This is because, although a longer codeword for the over-heard first CPE $U_{31}$ is used, the data transmission and the decoding/scheduling delays of the $U_{31}$-$AP_3$-$AP_2$-$AP_1$ route are eliminated. Moreover, there is the same end-to-end packet transmission delay for the isolated CPE:s because only the free spectrum is used, while the proposed variable-length coding and beamforming schemes provide almost the same end-to-end error probability as in the cases without blockage.

The proposed scheme reduces the cost of HARQ-based retransmissions. This is because the variable-length coding and the adapted decoding scheme makes it possible to decode the message only when a high probability for successful decoding is estimated. Thus, multiple decodings, used in typical HARQ-based schemes, are avoided. Also, the feedback overhead of sending ACK/NACK is eliminated, because ACK/NACK feedback is sent only when the AP decodes the signal based on all accumulated sub-codewords.

In summary, the disclosed scheme can provide the same end-to-end error probability and packet transmission delay as in the cases without blockage, without any need for multiple decodings and ACK/NACK feedbacks, or adding more hops to the route.

The over-heard CPE:s bypass the blockage, which reduces the effect of error propagation and frees up some spectrum to support the signals going through the blocked link. On the other hand, using alternative beams, variable-length coding and updated decoding scheme increases the probability of successful decoding for the messages of the isolated CPE:s. This makes the network robust to blockage/error propagation and improves the service availability. Also, the implementation complexity of the CPE:s is not increased, and does not add one more hops to the network.

Important parts of the present disclosure are:
1) dividing the CPE:s into different groups and sub-groups depending on their long-term channel conditions,
2) adapting the decoding and buffering schemes of the AP:s,
3) the proposed transmission schemes including the beamforming and power allocation,
4) the developed variable-length coding scheme to guarantee the end-to-end error probability constraints of the CPE:s and using the spectrum resources which have become free because of changing the route of the over-hearing CPE:s.

The present disclosure thus addresses the main problems of IAB networks which are related to the reliability of the AP-AP backhaul links and error propagation with no or marginal additional end-to-end packet transmission delay and no need for additional hops.

Here, an efficient data transmission technique for multi-hop IAB networks is provided that can reduce both the blockage and the error propagation effects without adding more hops to the network and/or increasing the end-to-end packet transmission delay. Moreover, the probability of requiring multiple hybrid automatic repeat request (HARQ)-based transmissions, the feedback overhead as well as the decoding complexity/delay of the AP:s are all reduced.

Depending on the CPE:s' positions, the CPE:s may be divided into different groups and sub-groups. Then, depending on the considered sub-group of the CPE:s, different data transmission techniques are considered in case an AP-AP link is temporally blocked. Particularly, variable-length coding and adaptive beamforming are used by the CPE:s/AP:s, and the decoding and buffering schemes of the AP:s are adapted correspondingly, such that the end-to-end error probability of the CPE:s can be maintained with no or marginal increment of the end-to-end packet transmission delay. Also, based on the updated data transmission approach, all AP:s and CPE:s synchronize their data transmission and adapt their timing. Importantly, according to some aspects, all adaptations are designed offline and, if a link is blocked, the network switches immediately to a different confirmation with no need for extra initial access or synchronization procedure The reliability of the network in the cases with blockage is increased, and the probability of error propagation is reduced. Particularly, the same end-to-end error probability is guaranteed for the CPE:s with no or marginal increment of the end-to-end packet transmission delay. Moreover, the cost of HARQ-based retransmissions as well as the decoding complexity/delay of the CPE:s are reduced. This results in higher reliability and end-to-end throughput in the cases experiencing blockage. The present disclosure is applicable for both uplink (UL) and downlink (DL) transmissions.

Figure 3A:
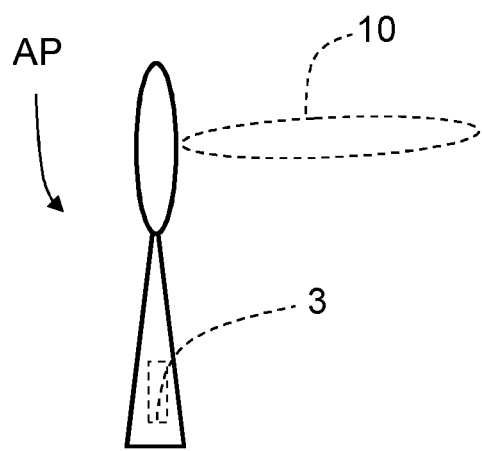
FIG. 3A schematically shows a first type node.
Figure 3B:
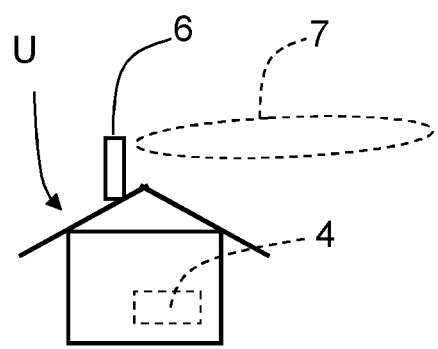
FIG. 3B schematically shows a second type node.

As shown in FIG. 3A, according to some aspects, the fourth access point $AP_3$ comprises a processor unit 3 that, in the case of the backhaul channel $H'_{32}$ between the first type node $AP_3$ and one other first type node $AP_2$ being determined to be blocked to a certain degree, is adapted to instruct the first CPE $U_{31}$ that is comprised in an over-heard sub-group, to communicate directly with the overhearing first type node $AP_1$ via a corresponding access channel $h_{31-1}$.

As shown in FIG. 3B, according to some aspects, the first CPE $U_{31}$ comprises a processor unit 4 that is adapted to initiate direct communicate with the overhearing second access point $AP_1$ via the corresponding access channel $h_{31-1}$ if the backhaul channel $H'_{32}$ between the fourth access point $AP_3$ and the second access point $AP_2$ has been determined to be blocked to a certain degree.

The present disclosure is not limited to the above, but may vary freely within the scope of the appended claims. For example, the present disclosure is applicable for both frequency division duplex (FDD) and time division duplex (TDD) schemes, different HARQ protocols as well as for both uplink (UL) and downlink (DL) transmission.

According to some aspects, the present disclosure can easily extended to the cases with arbitrary number of hops, different relaying approaches or star-like network configuration.

Generally, the present disclosure relates to a first type node $AP_3$ in a wireless communication system 1, wherein the first type node $AP_3$ is adapted to:
- communicate with at least one other first type node $AP_2$ in the wireless communication system 1 over a corresponding backhaul channel $H_{32}$ by means of one of at least one type of signal relaying that employs decoding and encoding, and
- communicate with a corresponding group of second type nodes $U_{31}$, $U_{32}$ via a corresponding access channel $h_{31}$, $h_{32}$, each group of second type nodes $U_{31}$, $U_{32}$ comprising at least one second type node $U_{31}$, $U_{32}$.

In the case of a backhaul channel $H'_{32}$ between the first type node $AP_3$ and one other first type node $AP_2$ being determined to be blocked to a certain degree, the first type node $AP_3$ is further adapted to instruct at least one second type node $U_{31}$ of the second type nodes in the group of second type nodes $U_{31}$, $U_{32}$ that is comprised in an over-heard sub-group, to communicate directly with an overhearing first type node $AP_1$ via a corresponding access channel $h_{31-1}$.

According to some aspects, the overhearing first type node $AP_1$ is separate from the first type node $AP_3$ and the other first type node $AP_2$, and where an additional spectral resource becomes available for communication between the first type node $AP_2$ and the other first type node $AP_3$ when the at least one second type node $U_{31}$ of the second type nodes in the group of second type nodes $U_{31}$, $U_{32}$ that is comprised in an over-heard sub-group, communicates directly with the overhearing first type node $AP_1$ via the corresponding access channel $h_{31-1}$.

According to some aspects, the first type node $AP_3$ is adapted to instruct the second type node $U_{31}$ to:
- encode a signal $\tilde{x}_{31}$ to be transmitted directly to the overhearing first type node $AP_1$ at an adapted transmission rate by means of two or more sub-signals $s_1$, $s_2$, $s_3$, $s_4$, and/or
- provide a wider antenna beam 7 towards the overhearing first type node $AP_1$.

According to some aspects, the first type node $AP_3$ is adapted to form an encoded signal $\tilde{x}_{32}$ corresponding to a signal $x_{32}$ received from at least one other second type node $U_{32}$ of the second type nodes in the group of second type nodes $U_{31}$, $U_{32}$ that is comprised in an isolated sub-group, and to forward the encoded signal $\tilde{x}_{32}$ to the other first type node $AP_2$ by being adapted to:
- encode the signal $\tilde{x}_{32}$ at an adapted transmission rate by means of two or more sub-signals $v_1$, $v_2$ and/or
- provide a wider antenna beam 7 towards the other first type node $AP_2$, and/or
- provide an increased transmission power.

According to some aspects, the first type node $AP_3$ is adapted to inform the other first type node $AP_2$ about the forwarded encoded signal $\tilde{x}_{32}$, enabling the other first type node $AP_2$ to decode each received signal $\tilde{x}_{32}$ having an adapted transmission rate comprising two or more sub-signals $v_1$, $v_2$ when all sub-signals $v_1$, $v_2$ of the signal have been received and buffered, and enabling the other first type node $AP_2$ to re-encode said signal $\tilde{x}_{32}$ for a nominal transmission rate, or at least for a data rate that is adapted to the free spectrum determined to be presently available, before forwarding the re-encoded signal $x_{32}$ to a further first type node $AP_0$, $AP_1$.

According to some aspects, after a predetermined time, the first type node $AP_3$ is adapted to check whether the backhaul channel $H'_{32}$ between the first type node $AP_3$ and the other first type node $AP_2$ is determined to be blocked to said certain degree based on determined link signal-to-noise ratio SNR between the first type node $AP_3$ and the other first type node $AP_2$ and/or whether the first type node $AP_3$ receives acknowledgement/negative acknowledgement, ACK/NACK, feedback to a certain degree from the other first type node $AP_2$.

According to some aspects, the first type node $AP_3$ is adapted for access communication with two or more other first type nodes $AP_0$, $AP_1$, $AP_2$, where the communication between all the first type nodes $AP_0$, $AP_1$, $AP_2$, $AP_3$ is a backhaul communication via corresponding backhaul channels $H_{10}$, $H_{21}$, $H_{32}$, and where the backhaul communication and the access communication both are performed by means of a common equipment at the first type nodes $AP_0$, $AP_1$, $AP_2$, $AP_3$.

According to some aspects, the first type node $AP_3$ comprises a processor unit 3 that, in the case of the backhaul channel $H'_{32}$ between the first type node $AP_3$ and one other first type node $AP_2$ being determined to be blocked to a certain degree, is adapted to:
- instruct at least one second type node $U_{31}$ of the second type nodes in the group of second type nodes $U_{31}$, $U_{32}$ that is comprised in an over-heard sub-group, to communicate directly with the overhearing first type node $AP_1$ via a corresponding access channel $h_{31-1}$.

Generally, the present disclosure also relates to a second type node $U_{31}$ in a wireless communication system 1, where the second type node $U_{31}$ is comprised in a group of at least one second type nodes $U_{31}$, $U_{31}$, where all second type nodes $U_{31}$, $U_{31}$ in the group are adapted to communicate with a first type node $AP_3$ via a corresponding access channel $h_{31}$, $h_{32}$. In the case of a backhaul channel $H'_{32}$ between the first type node $AP_3$ and one other first type node $AP_2$ being determined to be blocked to a certain degree, the second type node $U_{31}$ that is comprised in an over-heard sub-group is adapted to communicate directly with an overhearing first type node $AP_1$ via a corresponding access channel $h_{31-1}$.

According to some aspects, the overhearing first type node $AP_1$ is separate from the first type node $AP_3$ and the other first type node $AP_2$, and where an additional spectral resource becomes available for communication between the first type node $AP_2$ and the other first type node $AP_3$ when the second type node $U_{31}$ communicates directly with the overhearing first type node $AP_1$ via the corresponding access channel $h_{31\text{-}1}$.

According to some aspects, the second type node $U_{31}$ is adapted to:
  encode a signal $\tilde{x}_{31}$ to be transmitted directly to the overhearing first type node $AP_1$ at an adapted transmission rate by means of two or more sub-signals $s_1, s_2, s_3, s_4$, and/or
  provide a wider antenna beam 7 towards the overhearing first type node $AP_1$.

According to some aspects, the second type node $U_{31}$ is adapted to inform the overhearing first type node $AP_1$ about the forwarded encoded signal $\tilde{x}_{31}$, enabling the overhearing first type node $AP_1$ to decode each received signal $\tilde{x}_{31}$ having an adapted transmission rate comprising two or more sub-signals $s_1, s_2, s_3, s_4$ when all sub-signals $s_1, s_2, s_3, s_4$ of the signal $\tilde{x}_{31}$ have been received and buffered, and to re-encode said signal $\tilde{x}_{31}$ for a nominal transmission rate, or at least for a data rate that is adapted to the free spectrum determined to be presently available, before forwarding the re-encoded signal $x_{31}$ to a further first type node $AP_0$.

According to some aspects, the second type node $U_{31}$ comprises a processor unit 4 that is adapted to initiate direct communication with the overhearing first type node $AP_1$ via a corresponding access channel $h_{31\text{-}1}$ if a backhaul channel $H'_{32}$ between the first type node $AP_3$ and one other first type node $AP_2$ has been determined to be blocked to a certain degree.

Figure 4:
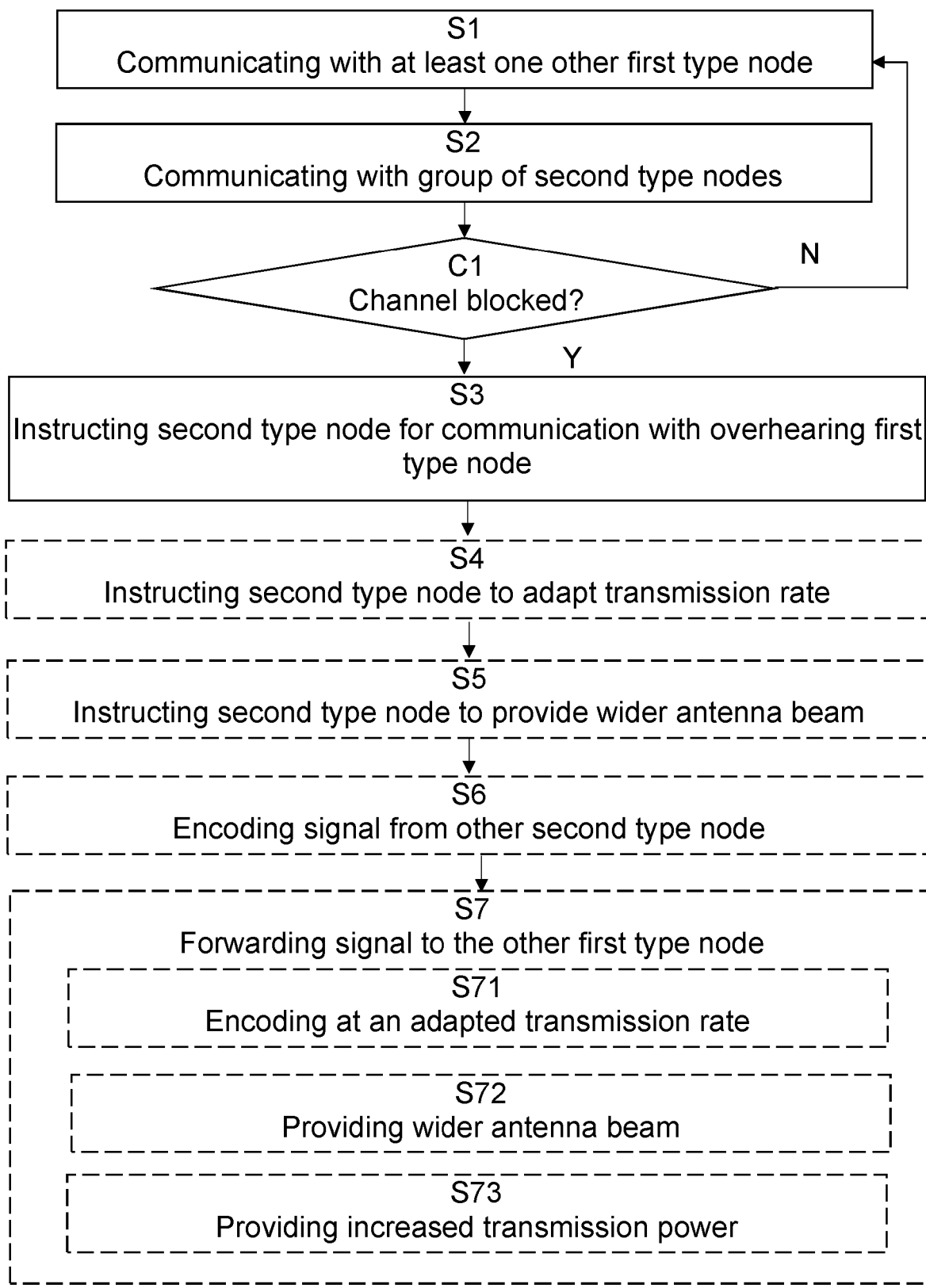
FIG. 4 shows a flowchart of methods in a first type node according to embodiments.

With reference to FIG. 4, the present disclosure also relates to a method in a first type node $AP_3$ in a wireless communication system 1, the method comprising communicating S1 with at least one other first type node $AP_2$ in the wireless communication system 1 over a corresponding backhaul channel $H_{32}$ using one of at least one type of signal relaying that employs decoding and encoding; and communicating S2 with a corresponding group of second type nodes $U_{31}, U_{32}$ via a corresponding access channel $h_{31}, h_{32}$, each group of second type nodes $U_{31}, U_{32}$ comprising at least one second type node $U_{31}, U_{32}$. In the case C1 of a backhaul channel $H'_{32}$ between the first type node $AP_3$ and one other first type node $AP_2$ being determined to be blocked to a certain degree, the method comprises instructing S3 at least one second type node $U_{31}$ of the second type nodes in the group of second type nodes $U_{31}, U_{32}$ that is comprised in an over-heard sub-group, to communicate directly with an overhearing first type node $AP_1$ via a corresponding access channel $h_{31\text{-}1}$.

According to some aspects, the overhearing first type node $AP_1$ is separate from the first type node $AP_3$ and the other first type node $AP_2$, and where an additional spectral resource becomes available for communication between the first type node $AP_2$ and the other first type node $AP_3$ when the at least one second type node $U_{31}$ of the second type nodes in the group of second type nodes $U_{31}, U_{32}$ that is comprised in an over-heard sub-group, communicates directly with the overhearing first type node $AP_1$ via the corresponding access channel $h_{31\text{-}1}$.

According to some aspects, the method comprises instructing S4 the second type node $U_{31}$ to encode the signal $\tilde{x}_{31}$ to be transmitted directly to the other overhearing type node $AP_1$ at an adapted transmission rate by means of two or more sub-signals $s_1, s_2, s_3, s_4$, and/or instructing S5 the second type node $U_{31}$ to provide a wider antenna beam 7 towards the overhearing first type node $AP_1$.

According to some aspects, the method comprises encoding S6 a signal $\tilde{x}_{32}$ from at least one other second type node $U_{32}$ of the second type nodes in the group of second type nodes $U_{31}, U_{32}$ that is comprised in an isolated sub-group, and forwarding S7 said signal $\tilde{x}_{32}$ to the other first type node $AP_2$. The forwarding S7 is accomplished by encoding S71 the signal $\tilde{x}_{32}$ at an adapted transmission rate by means of two or more sub-signals $v_1, v_2$, and/or providing S72 a wider antenna beam 7 towards the other first type node $AP_2$, and/or providing S73 an increased transmission power.

According to some aspects, after a predetermined time, the method comprises checking whether the backhaul channel H'32 between the first type node $AP_3$ and the other first type node $AP_2$ is determined to be blocked to said certain degree based on determined link signal-to-noise ratio (SNR) between the first type node $AP_3$ and the other first type node $AP_2$ and/or whether the first type node $AP_3$ receives acknowledgement/negative acknowledgement (ACK/NACK) feedback to a certain degree from the other first type node $AP_2$.

According to some aspects, the method comprises informing at least one the overhearing first type node $AP_1$ and the other first type node $AP_2$, about changes, enabling said first type node $AP_1, AP_2$ to decode each received signal $\tilde{x}_{32}, \tilde{x}_{32}$ having an adapted transmission rate comprising two or more sub-signals $s_1, s_2, s_3, s_4; v_1, v_2$ when all sub-signals $s_1, s_2, s_3, s_4; v_1, v_2$ of the signal have been received and buffered, and to re-encode said signal $\tilde{x}_{32}, \tilde{x}_{32}$ for a nominal transmission rate, or at least for a data rate that is adapted to the free spectrum determined to be presently available, before forwarding the re-encoded signal $x_{31}, x_{32}$ to a further first type node $AP_0, AP_1$.

Figure 5:
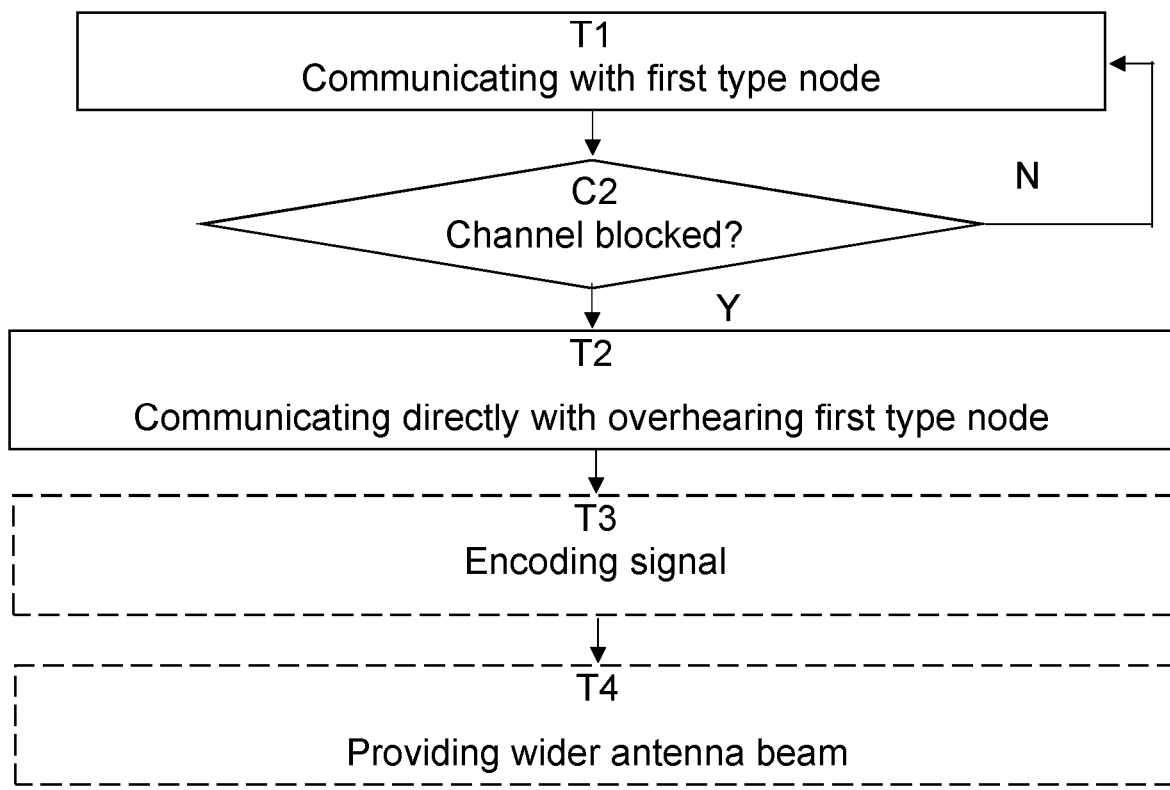
FIG. 5 shows a flowchart of methods in a second type node according to embodiments.

With reference to FIG. 5, the present disclosure also relates to a method in a second type node $U_{31}$ used in a group of at least one second type nodes $U_{31}, U_{31}$ in a wireless communication system 1, the method comprising communicating T1 with a first type node $AP_3$ via a corresponding access channel $h_{31\text{-}3}$. In the case C2 of a backhaul channel H'32 between the first type node $AP_3$ and one other first type node $AP_2$ being determined to be blocked to a certain degree, the method further comprises communicating T2 directly with an overhearing first type node $AP_1$ via a corresponding access channel $h_{31\text{-}1}$, such that an additional spectral resource becomes available for communication between the first type node $AP_3$ and the other first type node $AP_2$.

According to some aspects, the overhearing first type node $AP_1$ is separate from the first type node $AP_3$ and the other first type node $AP_2$, and where an additional spectral resource becomes available for communication between the first type node $AP_2$ and the other first type node $AP_3$ when the second type node $U_{31}$ communicates directly with the overhearing first type node $AP_1$ via the corresponding access channel $h_{31\text{-}1}$.

According to some aspects, the method comprises encoding T3 a signal $\tilde{x}_{31}$ to be transmitted directly to the overhearing first type node $AP_1$ at an adapted transmission rate by means of two or more sub-signals $s_1, s_2, s_3, s_4$, and/or providing T4 a wider antenna beam 7 towards the overhearing first type node $AP_1$.

According to some aspects, the method comprises informing the overhearing first type node $AP_1$ about the forwarded encoded signal $\tilde{x}_{31}$, enabling the overhearing first type node $AP_1$ to decode each received signal $\tilde{x}_{31}$ having an adapted transmission rate comprising two or more sub-signals $s_1, s_2, s_3, s_4$ when all sub-signals $s_1, s_2, s_3, s_4$ of the signal $\tilde{x}_{31}$ have been received and buffered, and to re-encode said signal $\tilde{x}_{31}$ for a nominal transmission rate, or at least for a data rate that is adapted to the free spectrum determined to be presently available, before forwarding the re-encoded signal $x_{31}$ to a further first type node $AP_0$.

The invention claimed is:

1. A first type node in a wireless communication system, wherein the first type node is adapted to:
    communicate with at least one other first type node in the wireless communication system over a corresponding backhaul channel by means-way of one of at least one type of signal relaying that employs decoding and encoding, and communicate with a corresponding group of second type nodes via a corresponding access channel, each group of second type nodes comprising at least one second type node;
    where, in the case of a backhaul channel between the first type node and one other first type node being determined to be blocked to a certain degree, the first type node is further adapted to: instruct at least one second type node of the second type nodes in the group of second type nodes that is comprised in an over-heard sub-group, to communicate directly with an overhearing first type node via a corresponding access channel;
    wherein the first type node is adapted to instruct the second type node further to: encode a signal to be transmitted directly to the overhearing first type node at an adapted transmission rate by way of two or more sub-signals, and provide a wider antenna beam towards the overhearing first type node.

2. The first type node according to claim 1, wherein the overhearing first type node is separate from the first type node and the other first type node, and where an additional spectral resource becomes available for communication between the first type node and the other first type node when the at least one second type node of the second type nodes in the group of second type nodes that is comprised in an over-heard sub-group, communicates directly with the overhearing first type node via the corresponding access channel.

3. The first type node according to claim 1, wherein the first type node is adapted to form an encoded signal corresponding to a signal received from at least one other second type node of the second type nodes in the group of second type nodes that is comprised in an isolated sub-group, and to forward the encoded signal to the other first type node by being adapted to:
    encode the signal at an adapted transmission rate by way of two or more sub-signals and/or
    provide a wider antenna beam towards the other first type node, and/or
    provide an increased transmission power.

4. The first type node according to claim 3, wherein the first type node is adapted to inform the other first type node about the forwarded encoded signal, enabling the other first type node to decode each received signal having an adapted transmission rate comprising two or more sub-signals when all sub-signals of the signal have been received and buffered, and enabling the other first type node to re-encode said signal for a nominal transmission rate, or at least for a data rate that is adapted to the free spectrum determined to be presently available, before forwarding the re-encoded signal to a further first type node.

5. The first type node according to claim 1, wherein, after a predetermined time, the first type node is adapted to check whether the backhaul channel between the first type node and the other first type node is determined to be blocked to said certain degree based on determined link signal-to-noise ratio, SNR, between the first type node and the other first type node and/or whether the first type node receives acknowledgement/negative acknowledgement, (ACK/NACK), feedback to a certain degree from the other first type node.

6. The first type node according to claim 1, wherein the first type node is adapted for access communication with two or more other first type nodes, where the communication between all the first type nodes is a backhaul communication via corresponding backhaul channels, and where the backhaul communication and the access communication both are performed by way of a common equipment at the first type nodes.

7. The first type node according to claim 1, wherein the first type node comprises a processor unit that, in the case of the backhaul channel between the first type node and one other first type node being determined to be blocked to a certain degree, is adapted to:
    instruct at least one second type node of the second type nodes in the group of second type nodes that is comprised in an over-heard sub-group, to communicate directly with the overhearing first type node via a corresponding access channel.

8. A method in a first type node in a wireless communication system, the method comprising:
    communicating with at least one other first type node in the wireless communication system over a corresponding backhaul channel using one of at least one type of signal relaying that employs decoding and encoding; and
    communicating with a corresponding group of second type nodes via a corresponding access channel, each group of second type nodes comprising at least one second type node;
    where, in the case of a backhaul channel between the first type node and one other first type node being determined to be blocked to a certain degree, the method comprises: instructing at least one second type node of the second type nodes in the group of second type nodes that is comprised in an over-heard sub-group, to communicate directly with an overhearing first type node via a corresponding access channel;
    wherein the method further comprises: instructing the second type node to encode the signal to be transmitted directly to the other overhearing first type node at an adapted transmission rate by way of two or more sub-signals, and instructing the second type node to provide a wider antenna beam towards the overhearing first type node.

9. The method according to claim 8, wherein the overhearing first type node is separate from the first type node and the other first type node, and where an additional spectral resource becomes available for communication between the first type node and the other first type node when the at least one second type node of the second type nodes in the group of second type nodes that is comprised in an over-heard sub-group, communicates directly with the overhearing first type node via the corresponding access channel.

10. The method according to claim 8, wherein the method comprises:
    encoding a signal from at least one other second type node of the second type nodes in the group of second type nodes that is comprised in an isolated sub-group, and forwarding said signal to the other first type node by:
    encoding the signal at an adapted transmission rate by way of two or more sub-signals, and/or providing a wider antenna beam towards the other first type node, and/or providing an increased transmission power.

11. The method according to claim 8, wherein, after a predetermined time, the method comprises checking whether the backhaul channel between the first type node and the other first type node is determined to be blocked to said certain degree based on determined link signal-to-noise ratio, (SNR), between the first type node and the other first type node and/or whether the first type node receives acknowledgement/negative acknowledgement, (ACK/NACK), feedback to a certain degree from the other first type node.

12. The method according to claim 8, wherein the method comprises informing at least one the overhearing first type node and the other first type node, about changes, enabling said first type node to decode each received signal having an adapted transmission rate comprising two or more sub-signals when all sub-signals of the signal have been received and buffered, and to re-encode said signal for a nominal transmission rate, or at least for a data rate that is adapted to the free spectrum determined to be presently available, before forwarding the re-encoded signal to a further first type node.

* * * * *